(12) United States Patent
Jansen (10) Patent No.: US 6,931,831 B2
(45) Date of Patent: Aug. 23, 2005

(54) DISTRIBUTOR PURGE VALVE (75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 192 days.

(21) Appl. No.: 10/462,295

(22) Filed: Jun. 16, 2003

(65) Prior Publication Data
US 2005/0160716 A1 Jul. 28, 2005

Related U.S. Application Data (60) Provisional application No. 60/389,827, filed on Jun. 18, 2002.

(51) Int. Cl.[7] .................................................. F02G 3/00
(52) U.S. Cl. ..................... 60/39.094; 60/741; 137/240; 137/625.48
(58) Field of Search .............................. 60/39.094, 734, 60/740, 741; 137/240, 625.48; 239/127, 239/106

(56) References Cited

U.S. PATENT DOCUMENTS

| | | | | |
|---|---|---|---|---|
| 2,770,945 A | * | 11/1956 | Crim | ........................ 60/39.091 |
| 3,038,487 A | | 6/1962 | Gardner | |
| 3,139,908 A | * | 7/1964 | Strader | .................. 137/625.48 |
| 3,338,257 A | | 8/1967 | Ferguson | |
| 3,632,080 A | | 1/1972 | King | |
| 3,683,966 A | * | 8/1972 | Payne | .................. 137/625.48 |
| 3,703,185 A | | 11/1972 | Usry | |
| 4,041,695 A | | 8/1977 | Harper et al. | |
| 4,095,418 A | | 6/1978 | Mansson et al. | |
| 4,206,595 A | * | 6/1980 | Cole | ........................ 60/39.094 |
| 4,222,405 A | | 9/1980 | Rosenblad | |
| 4,327,772 A | * | 5/1982 | Kawabata | .............. 137/625.48 |
| 4,344,453 A | * | 8/1982 | Tuchenhagen et al. | ..... 137/240 |
| 4,359,929 A | | 11/1982 | Stearns | |
| 4,375,873 A | * | 3/1983 | Enomoto et al. | ............. 236/86 |
| 4,467,957 A | | 8/1984 | Bucheit | |
| 4,501,298 A | * | 2/1985 | Inada et al. | ............ 137/625.48 |
| 4,531,587 A | | 7/1985 | Fineberg | |
| 4,687,055 A | | 8/1987 | Leggett | |
| 4,760,696 A | * | 8/1988 | Rooks et al. | ............. 60/39.281 |
| 5,245,819 A | * | 9/1993 | Kast | ............................ 60/734 |
| 5,346,175 A | | 9/1994 | Hunnicutt | |

(Continued)

Primary Examiner—Cheryl Tyler
Assistant Examiner—William H. Rodriguez
(74) Attorney, Agent, or Firm—Quarles & Brady LLP

(57) ABSTRACT

A combination distributor purge valve unit for a turbine engine has a pilot air section, a fuel section, a distributor section and a purge air section. A spool moves along a spool axis to control flow through six sets of radially arranged removable fill nozzles and fixed outlet orifices in the distributor section. The spool moves from its initial position in which the distributor outlets are in communication with the inlet to the purge air section and closed off from the inlet to the fuel section so that high temperature purge air can forced passed the downstream side of the spool and into the nozzles in the combustion can of the turbine engine to eliminate coking in these areas. The spool moves against a biasing spring under the force of a pilot air driven actuator piston and the force of the pressurized fuel so that fuel can flow, initially through the fill nozzles and then the outlet orifices, to the combustion can.

22 Claims, 7 Drawing Sheets

U.S. PATENT DOCUMENTS

| | | |
|---|---|---|
| 5,391,055 A | 2/1995 | Carvalho |
| 5,448,890 A * | 9/1995 | Coughlan et al. ............. 60/747 |
| 5,449,023 A * | 9/1995 | Cleland et al. ............. 137/597 |
| 5,809,771 A * | 9/1998 | Wernberg ................ 60/39.094 |
| 5,884,483 A * | 3/1999 | Munro ........................ 60/739 |
| 6,050,081 A | 4/2000 | Jansen et al. |
| 6,385,962 B2 * | 5/2002 | Futa et al. ............... 60/39.094 |
| 6,412,271 B1 * | 7/2002 | Maker et al. .............. 60/39.08 |
| 6,442,925 B1 * | 9/2002 | Dalton et al. ............ 60/39.094 |
| 6,497,100 B2 * | 12/2002 | Blot-Carretero et al. ...... 60/734 |
| 6,807,801 B2 * | 10/2004 | McCarty ................. 60/39.094 |
| 2005/0000578 A1 * | 1/2005 | Eberhardt et al. ..... 137/625.48 |

\* cited by examiner

DISTRIBUTOR PURGE VALVE

CROSS-REFERENCE TO RELATED APPLICATION

This application claims benefit to U.S. provisional application Ser. No. 60/389,827 filed Jun. 18, 2002.

STATEMENT OF FEDERALLY SPONSORED RESEARCH OR DEVELOPMENT

Not applicable.

BACKGROUND OF THE INVENTION

1. Technical Field

The present invention relates to valves, and in particular, to valves for use with turbine engines.

2. Description of the Related Art

Gas turbine engines employ a set of rotating turbine blades to compress air leading to a combustion can into which fuel is injected and ignited. Fuel is delivered through metering orifices to burners in the combustion chamber under pressure through a fuel line. Combustion of the fuel in the combustion can turns a downstream set of blades from which energy is extracted and which can also be used to drive the compressor blades.

Many gas turbine engines are operable in liquid fuel (such as diesel fuel) and gaseous fuel (such as natural gas) modes. When the engine is to be shut down or when the engine is operated in gas mode, the fuel pump supplying liquid fuel is turned off, a fuel line valve closed and the fuel line and the burner nozzles are purged with hot gases from the turbine compressors. The purging air cools the burner nozzles as well as prevents "coking" at the metering orifices, which occurs when the volatile components of the fuel are driven off by heat such that only a tarry deposit remains. Purging is necessary to prevent the burners from being damaged as well as to ensure that the system orifices and valves are clear of such deposits which could inhibit proper conduit of the fuel when the engine is returned to fuel mode.

In order to permit purging of the fuel line, a purging air line must join with the fuel line. It is important that the fueling and purging operations be isolated so that fuel does not go down the air purge line and hot gases do not travel up the fuel line to the fuel supply. Check valves are often installed in each of these lines to prevent this. However, common spring-loaded checks may be unreliable, sticking in the open position or allowing some backwash into either of the fuel or purge lines. Alternatively, the fuel cut-off valve may be operated by a pneumatic actuator in line with the check valve of the fuel line, however, this is also subject to coking and may introduce substantial pressure drops in the fuel flow. The fuel cut-off valve also introduces a potential failure point to the turbine where, if pressure is lost to the pneumatic actuator, the turbine will cease operating.

A three-way purge valve is disclosed in U.S. Pat. No. 6,050,081, assigned to the assigned of the present invention and hereby incorporated by reference as though fully set forth herein, which provides a significantly more reliable mechanism for air purging and fuel control, both preventing backwash and being more resistant to coking. As disclosed, a spool valve having an enlarged middle section was used to shuttle between positions alternatively blocking the combustion can from either the purge air line or the fuel line. The spool is biased to close off the fuel line and is urged to open the fuel line by a pilot air actuated piston. Thus, when fuel is to be closed off from the engine, the spool valve will return to its initial position thereby allowing the burner nozzles and the downstream side of the spool to be purged to reduce or eliminate coking in these areas.

Typical gas turbine combustion cans have multiple burners or combustion zones which must be separately supplied with fuel. A distributor is thus mounted to the combustion can to act as a manifold to which the several fuel lines connect before the fuel is routed to the individual burners or zones in the combustion can. This additional component and additional lines add significant cost, assembly and size to the system. And, these parts create additional areas for coking to occur, particularly given that the distributor is typically mounted directly to the combustion can which realizes extreme temperatures during combustion.

Accordingly, an improved valve is needed that has the advantages of the three way purge valve described above but with reduced assembly, size and potential for coking.

SUMMARY OF THE INVENTION

The present invention is a combination distributor and purge valve in which a single valve unit provides control of fuel and anti-coking purge air directly to the several burners of a combustion can of a gas turbine engine without the need for intermediate lines or a separate distributor manifold. Fuel is delivered to the combustion can directly from the valve, and when fuel is not being used, high temperature purge air is delivered through the valve to the combustion can to cool and de-coke the burners and the valve itself.

Specifically, the invention provides a combination distributor purge valve unit for a turbine engine. The valve includes a fuel section having a fuel inlet, a purge air section having an air inlet, and a distributor section disposed between the fuel section and the purge air section and having a plurality of outlets. A spool moves along a spool axis from a first position in which the plurality of outlets are in communication with the air inlet and closed off from the fuel inlet to a second position in which the plurality of outlets are in communication with the fuel inlet and closed off from the air inlet.

Each of the plurality of outlets in the distributor section can include first and second passageways in communication with the air inlet when the spool is in the first position and in communication with the fuel inlet when the spool is in the second position. The first passageways can be fill nozzles and the second passageways can be outlet orifices of greater diameter than the fill nozzles. Preferably, the fill nozzles are threaded to the distributor section for replacement and interchangeability. The distributor section has two or more (preferably six) outlets spaced equiangularly about the spool axis such that the fill nozzles and outlet orifices extend radially from a spool chamber in which the spool moves. One annular seal is disposed between the distributor outlets and the fuel inlet and a second annular seal is disposed between these outlets and the air inlet such that a valve section of the spool can mate with the annular seals. Preferably, the spool is movable to an intermediate position along the spool axis between the first and second positions in which the fill nozzles are in communication with the fuel inlet and closed off from the air inlet and the outlet orifices are closed off from both the air inlet and the fuel inlet.

In addition to the fuel, distributor and purge air sections, the valve also has a pilot air section adjacent the fuel section and containing an actuator piston disposed along the spool axis operable by pilot air to move the spool away from the fuel closed position in which it is biased by a spring. When the spool is in this position, an end of the actuator piston contacts the spool within a spool chamber in which the spool is disposed. The actuator piston is biased in the direction along the spool axis away from the spool so that it returns to its initial position when the pilot air pressure is reduced. The position of the actuator piston can be identified from the outside of the valve by an indicator stem protruding through the pilot air section of the valve.

The actuator piston moves within a piston chamber in the pilot air section. To prevent fuel from leaking through the interface between the fuel and pilot air sections into the piston chamber (and potential out of an ambient vent therein), an interstitial vent is disposed between the spool chamber and the piston chamber and two annular seals are disposed about the stem of the actuator piston on each side of the interstitial vent.

In addition, the valve is equipped with a venturi module disposed in the fuel inlet and a particle trap opposite the venturi passageway on a side of the spool chamber opposite the venturi passageway. Solid particles and debris in the fuel stream will by accelerated through the venturi passageway and be carried by momentum past the spool chamber for collection in the trap. The trap can be accessed for cleaning through a removable access plug.

The valve operates by the spool moving from its initial position in which the distributor outlets are in communication with the inlet to the purge air section and closed off from the inlet to the fuel section so that high temperature purge air can be forced passed the downstream side of the spool and to the burners in the combustion can of the turbine engine to eliminate coking in these areas that may otherwise occur when the turbine engine is operated for prolonged periods in gaseous fuel mode controlled by a separate valve. The spool moves against the biasing spring under the force of the pilot air driven actuator piston and the force of the pressurized fuel so that fuel can flow, initially through the fill nozzles and then the outlet orifices, directly to the combustion can. The fuel section further includes a recirculation port in communication with the fuel inlet so that when the spool closes the outlet orifices and fill nozzles, fuel circulates through the fuel section past an upstream side of a valve section of the spool to prevent coking in this area as well. Proper and low maintenance operation of the valve (and the gas turbine) are further provided for by collecting and removing particles from the fuel stream.

These and still other advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

DETAILED DESCRIPTION OF THE PREFERRED EMBODIMENT

Figure 1:
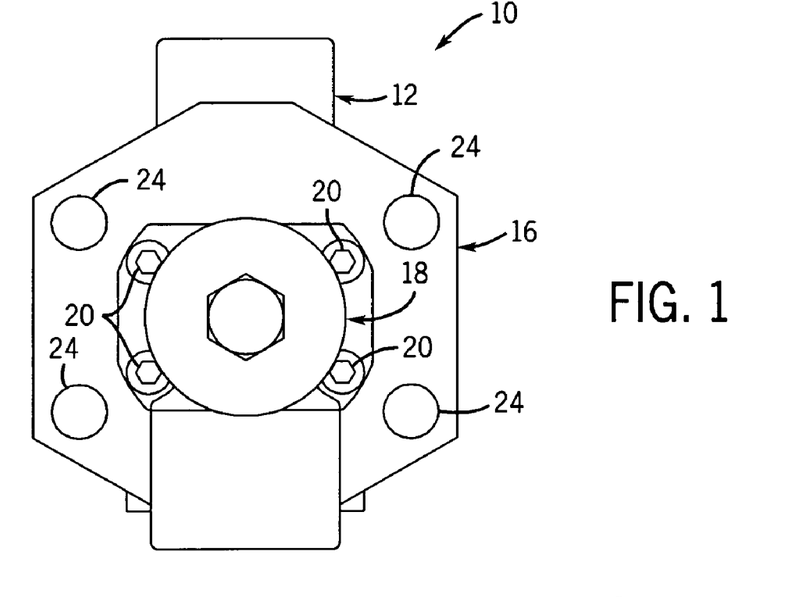
FIG. 1 is a left end view of a combination distributor and purge valve unit for a gas turbine engine according to the present invention.
Figure 2:
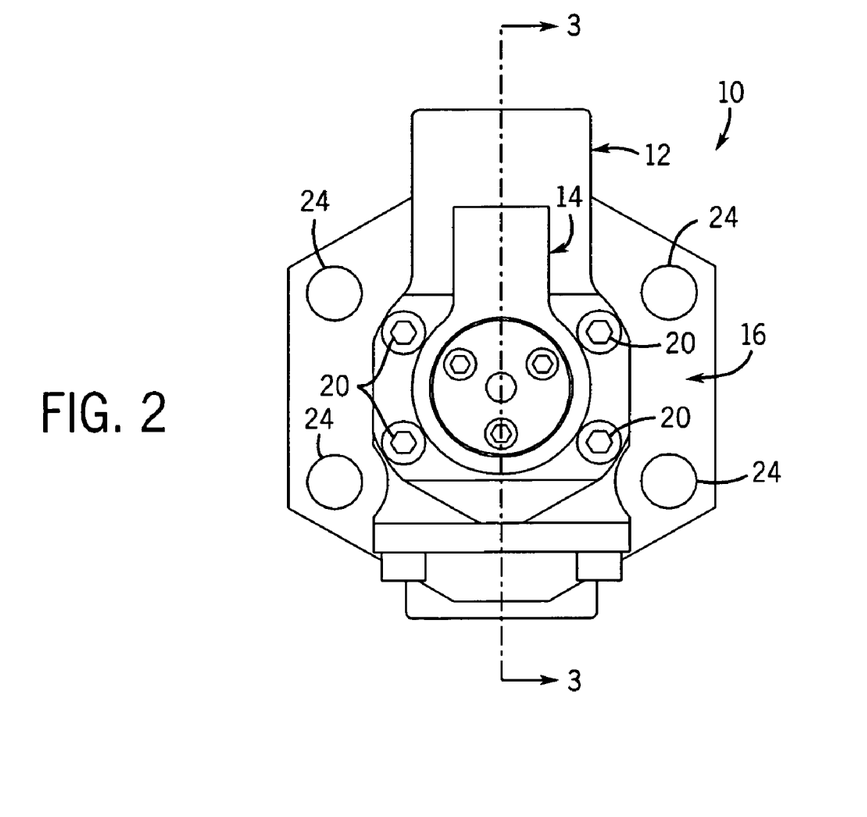
FIG. 2 is a right end view thereof.
Figure 3:
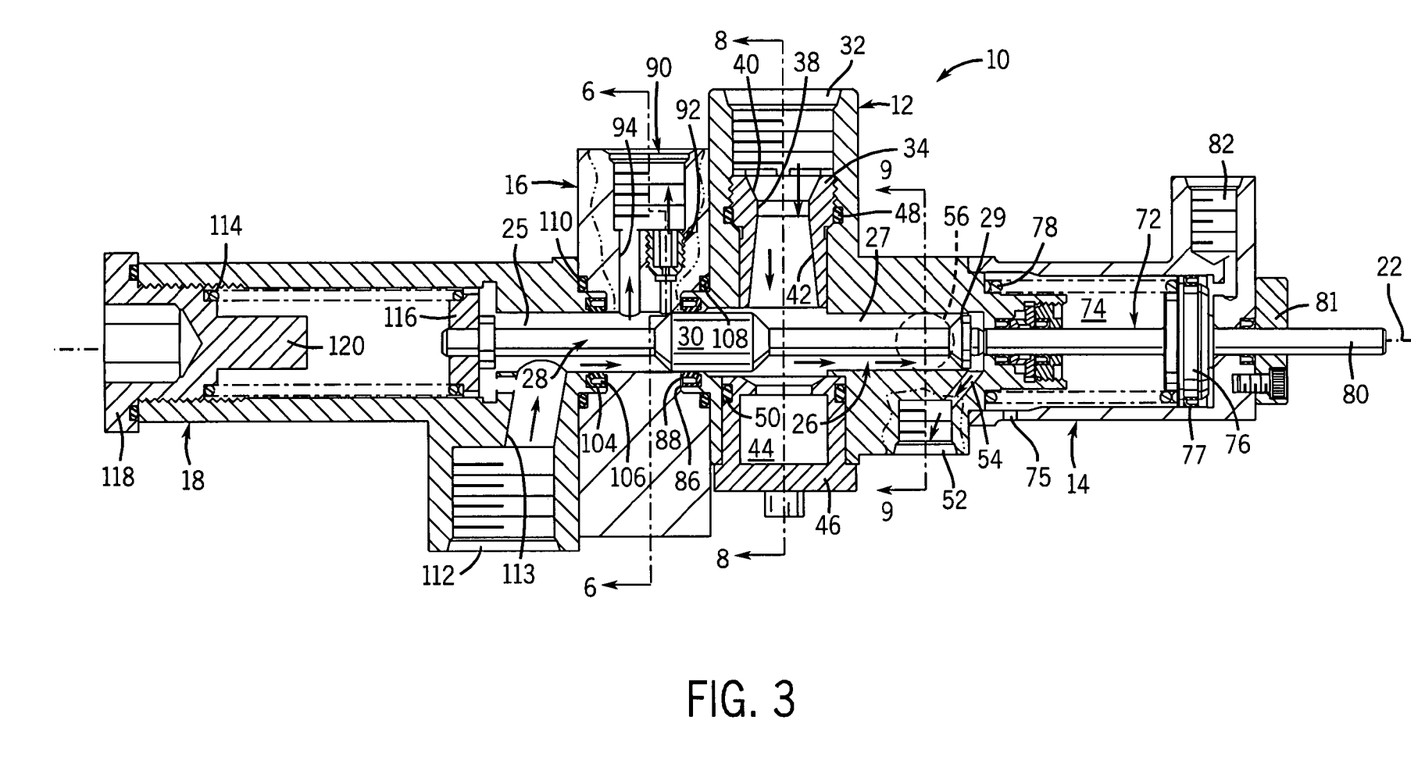
FIG. 3 is a cross-sectional view through line 3—3 of FIG. 2 showing the valve in a purge mode.

Referring now to FIGS. 1–3, a combination distributor purge valve unit 10 of the present invention is an assembly of a fuel section 12 with a pilot air section 14 mounted to one end and a distributor section 16 mounted to the opposite end to which is mounted a purge air section 18. These sectional components are assembled by bolts 20 to lie along a spool axis 22. The valve is preferably mounted to a combustion can (not shown) of a gas turbine engine (not shown) via rods (not shown) disposed through four mounting openings 24 in the distributor section 16. The use of rods minimizes the contact of the valve 10 with the combustion can, thereby reducing thermal conduction and the associated adverse effects, particularly coking.

Referring to FIG. 3, the fuel section 12, distributor section 16 and purge air section 18 define a central spool chamber 26, having an air only area 25 and a fuel only area 27, concentric with the spool axis 22 in which an elongated spool member 28 is disposed. On either side of the valve section 30, the spool 28 necks down to a narrower outside dimension and extends into the air only 25 and the fuel only 27 areas. A tapered guide flange 29 at one end serves to guide the spool 28 along the spool axis 20 within the spool chamber 26. The spool 28 is movable along the spool axis 22 during operation of the valve 10 to position an enlarged cylindrical valve section 30 of the spool 28 as needed to control fuel and purge air flow through the valve 10 as will be described below.

Figure 8:
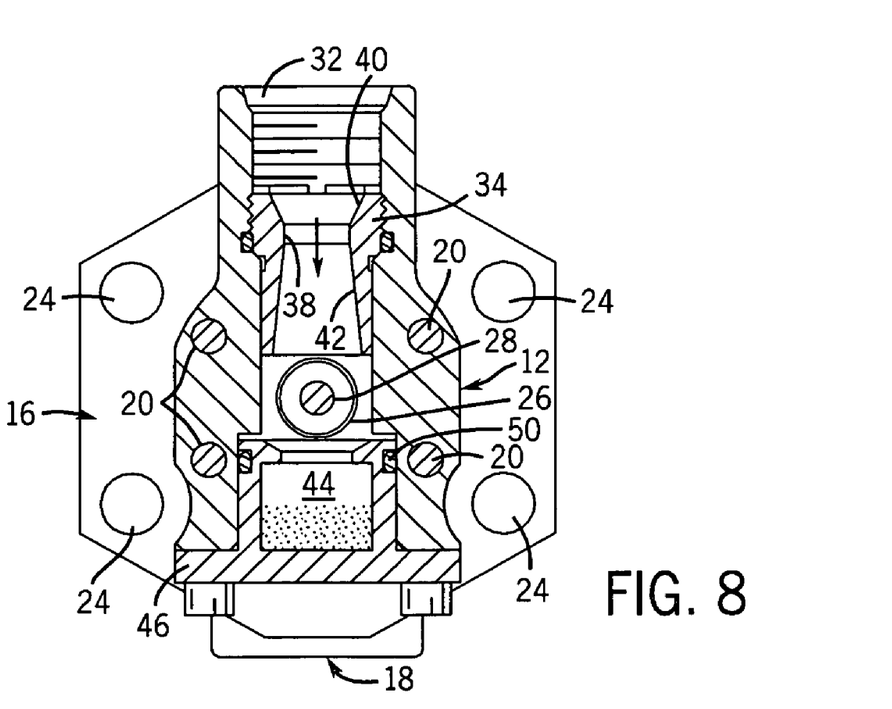
FIG. 8 is a cross-sectional view taken through line 8—8 of FIG. 3 showing a venturi fuel inlet and particle trap of a fuel section of the valve.

The fuel section 12 has a fuel inlet 32 in communication with the fuel only area 27 of the spool chamber 26 and having a port receiving a fitting connecting a fuel line (not shown) leading from a source of pressurized fuel, typically from a fuel pump (not shown) that may be separately activated when fuel is required for the turbine. As shown in FIG. 8, the fuel inlet 32 includes a sealed thread-in module 34 defining a venturi passageway 36 (with the conventional narrowed neck 38 and oppositely tapered entrance 40 and exit 42 passages). The venturi passageway 36 acts to increase the velocity of the incoming fuel so that any solid particles or debris in the fuel will by carried by momentum through the spool chamber 26 to a cavity defining a particle trap 44 that can be accessed through a removable access plug 46 for cleaning. In use, the valve 10 is preferably oriented as shown in FIG. 3 so that gravity assists the deposit of particles in the trap 44, however, it can function in any orientation, but it is preferred to be oriented with the fuel inlet 32 positioned between 9 o'clock and 3 o'clock. Seals 48 and 50 are disposed around the module 34 and access plug 46.

Figure 9:
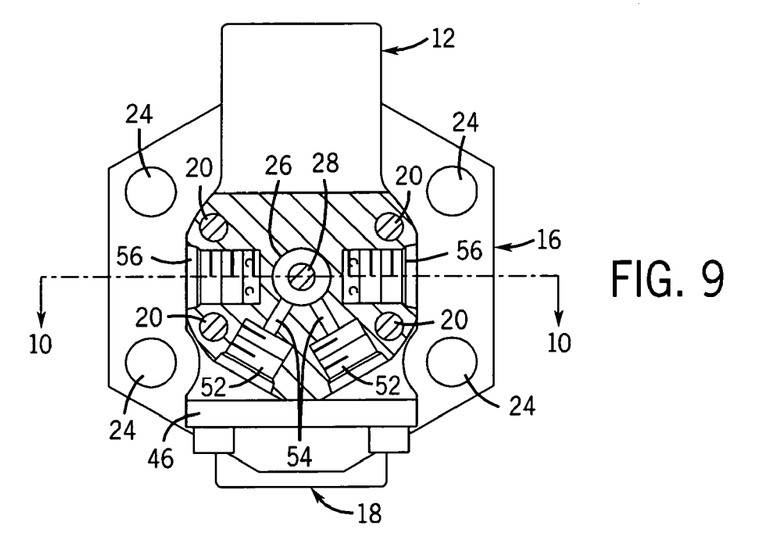
FIG. 9 is a cross-sectional view taken through line 9—9 of FIG. 3 showing interstitial vent and recirculation ports of the fuel section of the valve.

As shown in FIG. 9, the fuel section 12 also has two recirculation ports 52 in communication with the spool chamber 26 though internal passageways 54. The recirculation ports 52 receive fittings for return lines (not shown) that couple to the fuel source so that fuel can be circulated through the valve 10 when not being routed to the turbine to reduce coking at the upstream side of the spool valve section 30.

Figure 10:
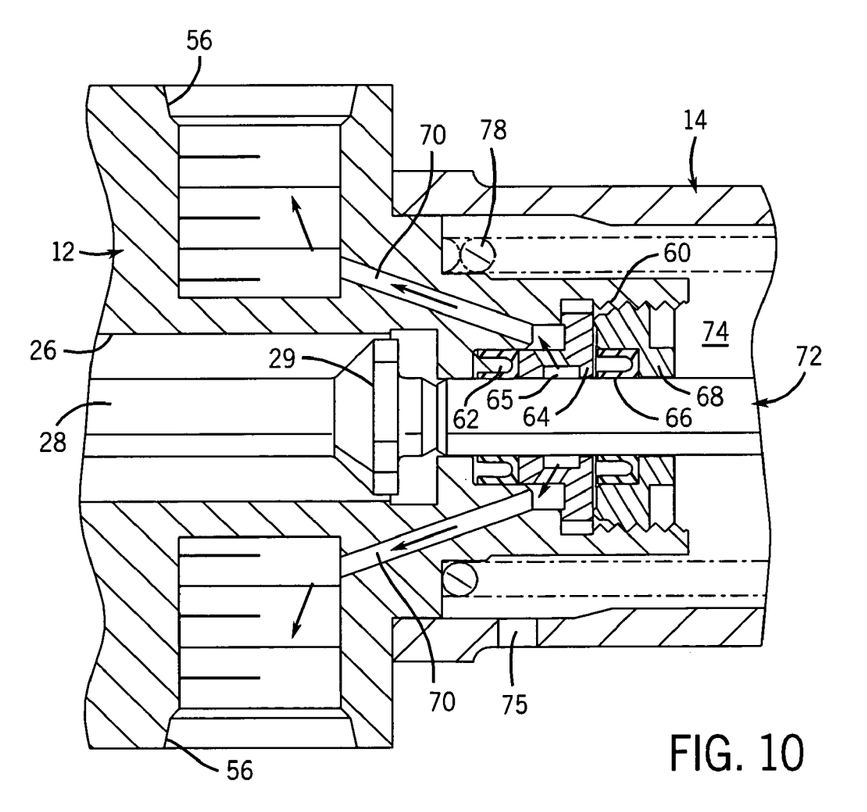
FIG. 10 is a partial sectional view taken through line 10—10 of FIG. 9 showing the interstitial vent ports and a double seal arrangement about the stem of an actuator piston in an pilot air section of the valve.

As shown in FIG. 10, the fuel section 12 also has two vent ports 56 that receive fittings for connecting vent lines (not shown) that deliver fuel that may leak from the fuel section 12 to the pilot air section 14. The fuel section 12 has a pocket 60 at the end where the pilot air section 14 attaches that receives a primary annular seal 62, an intermediate body 64 having an interstitial vent 65 and a back up annular seal 66, all of which is secured in the pocket 60 by a threaded retainer 68. Any fuel leaking past the primary seal 62 will be blocked by the back up seal 66 and directed through the interstitial vent 65 to internal passageways 70 to the vent ports 56 and out of the valve 10.

The primary 62 and back up 66 seats against the circumference of the stem of an actuator piston 72 that moves within a piston chamber 74 (vented to ambient by vent 75) of the pilot air section 14 along the spool axis 22. Referring again to FIG. 3, the actuator piston 72 has an enlarged head 76 (with a piston seal 77) that is biased by a spring 78 within the piston chamber 74 away from the fuel section 12 and moves along the spool axis 22 until it bottoms on the end of the fuel section 12. An indicator stem 80 protrudes through a sealed end cap 81 mounted to the pilot air section 14 to the exterior of the valve 10 to provide a visual indication of the position of the actuator piston 72 during operation of the valve 10. The actuator piston 72 moves against the spring 78 by pressurized pilot air coming from lines coupled to the pilot air inlet port 82 and routed through passageway 84 to the piston chamber 74. Movement of the actuator piston 72 initiates movement of the spool 28 as will be described. Note that the end of the spool 28 abutting the actuator piston stem is not attached thereto, but rather the spool 28, in some circumstances to be described below, may move freely away from the stem.

Figure 6:
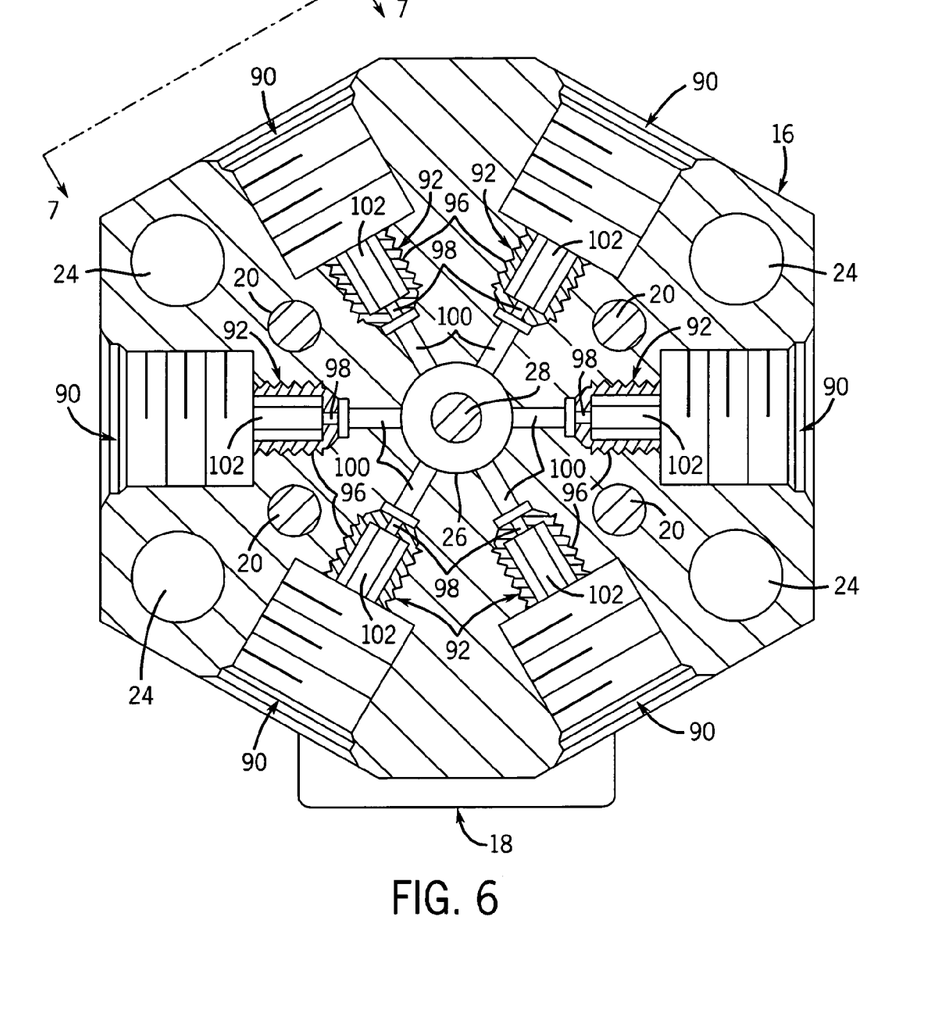
FIG. 6 is a cross-sectional view taken through line 6—6 of FIG. 3 showing six radially disposed outlet ports in a distributor section of the valve.
Figure 7:
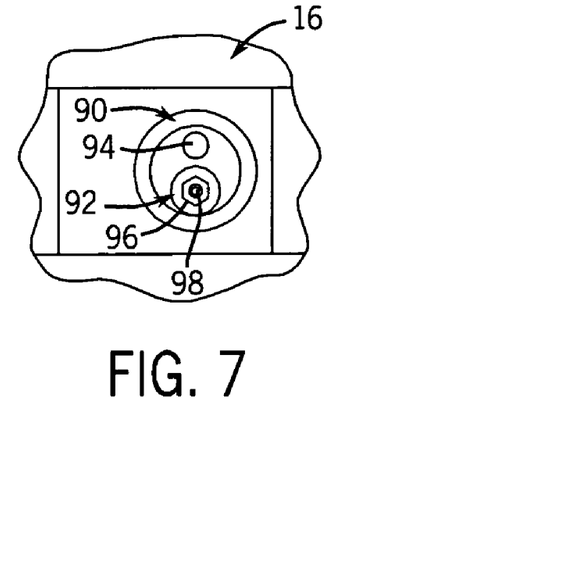
FIG. 7 is a partial view of a single outlet port looking from line 7—7 of FIG. 6.

Referring now to FIGS. 3, 6 and 7, the distributor section 16 mounts over a pocket 86 at the end of the fuel section 12 opposite the pilot air section 14. The pocket 86 contains a first annular seal 88 sized to seal against the valve section 30 of the spool 28. The distributor section 16 is, in the preferred form disclosed herein, an octagonal body defining six outlet ports 90 that receive fittings coupling individual fuel lines (not shown) leading to each of the burners in the combustion can of the turbine. The first annular seal 88 thus seals the fuel inlet 32 from the outlet ports 90 (and thereby the combustion chamber of the turbine) when the spool 28 is in the position shown in FIG. 3.

Specifically, with reference to FIGS. 6 and 7, each of the six outlet ports 90 includes a fill nozzle 92 and an outlet orifice 94. The fill nozzle 92 is actually a separate body 96 that threads into a threaded bore in the distributor section 16. The nozzle body 96, similar in structure to a modified set screw, has a nozzle bore 98 in communication with an internal passageway 100, which is in communication with the spool chamber 26. The nozzle body 96 has a central recess 102 of a configuration to accept a tool, such as a hex wrench, for installing and removing the nozzle body 96 for cleaning, replacement or exchanging it for a nozzle body 96 having different diameter nozzle bore 98. Each fill nozzle 92 is located upstream (closer to the fuel inlet 32) from the associated outlet orifice 94, which is designed to have a larger diameter bore so that the outlet orifices 94 act as the primary orifices for fueling, while the smaller bore fill nozzles 92 are used primarily to prime the fuel lines and burners during turbine start up.

The purge air section 18 mounts onto the side of the distributor section 16 opposite the fuel section 12 and has an end that defines a pocket 104 for a second annular seal 106 sealing against the valve section 30 of the spool 28. The second annular seal 106 is identical to the first annular seal 88, being disposed about the spool axis 22 and having the same internal diameter. These seals 88 and 106 cooperate with the valve section 30 of the spool 28 to control the separate flows of fuel and purge air to the combustion can of the turbine and isolate the fuel from the purge air within the valve 10. In particular, the cylindrical valve section 30 of the spool 28 is essentially equal in diameter to the internal diameter of the seals 88 and 106 so as to prevent flow through the seals 88 and 106 when the valve section 30 is within either or both of the seals 88 and 106. The valve section 30 extends along the spool axis 22 a distance greater than the separation between the seals 88 and 106 so that both seals 88 and 106 may be blocked and at no time is more than one seal 88 or 106 open. Note also that seals 108 and 110 are disposed between the mating surfaces of the distributor section 16 and the fuel section 12 and the distributor section 16 and the purge air section 18, respectively, to prevent external leakage between these adjoining sections.

The purge air section 18 includes a purge air inlet port 112 in communication with the air only area 25 of the spool chamber 26 via passageway 113 and receiving a fitting coupling an air line (not shown) leading from a compressor stage of the turbine, which provides a source of hot air (400° Fahrenheit). A compression spring 114 abuts a retaining disk 116 having a hole in which fits an end of the spool 28 so that the spring 114 can bias the spool 28 toward the fuel section 12 to close the seal 88 and to press the opposite end of the spool 28 against the end of the actuator piston stem. A sealed end cap 118 threaded into an open end of the purge air section 18 backs the spring 114 and has a central stop 120 that the near end of the spool 28 contacts when in the position shown in FIG. 5.

Figure 4:
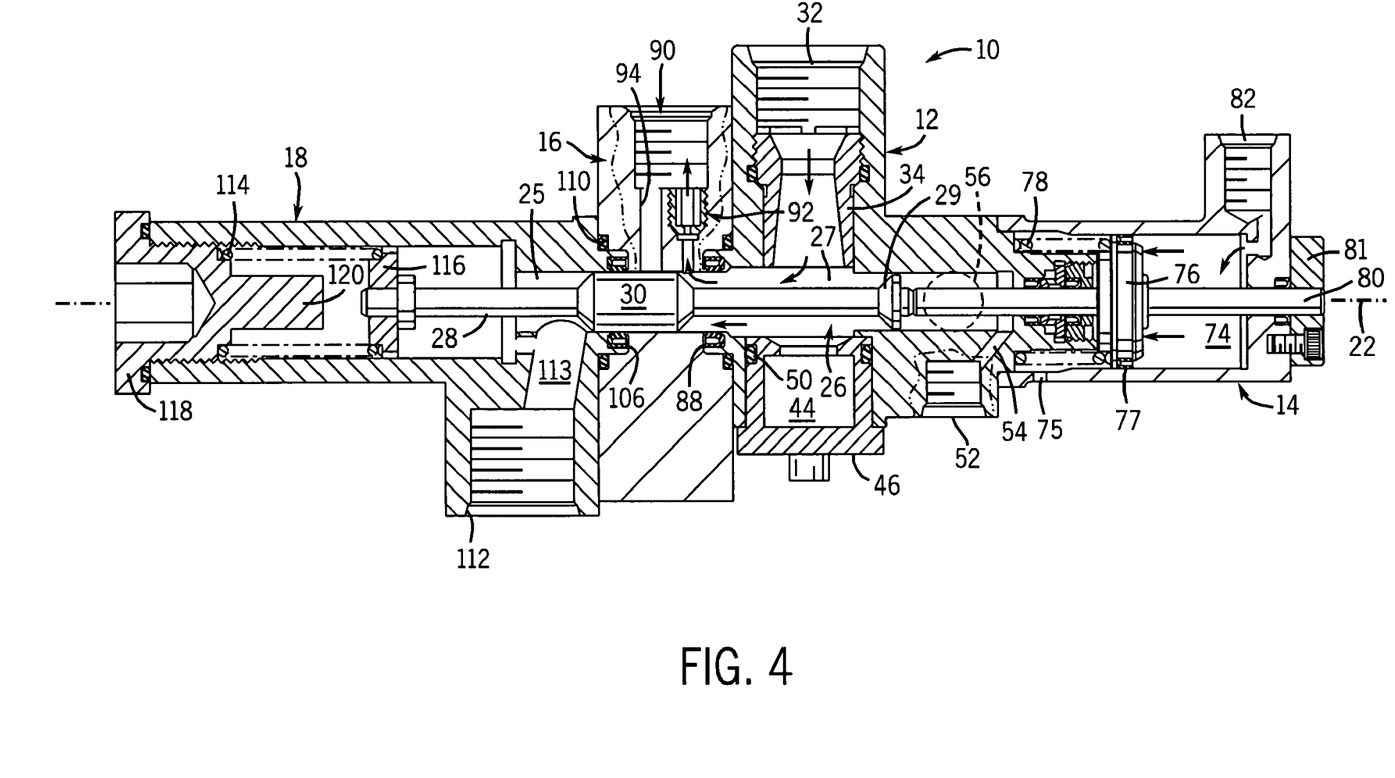
FIG. 4 is a cross-sectional view similar to FIG. 3 albeit showing the valve in a fuel fill mode.
Figure 5:
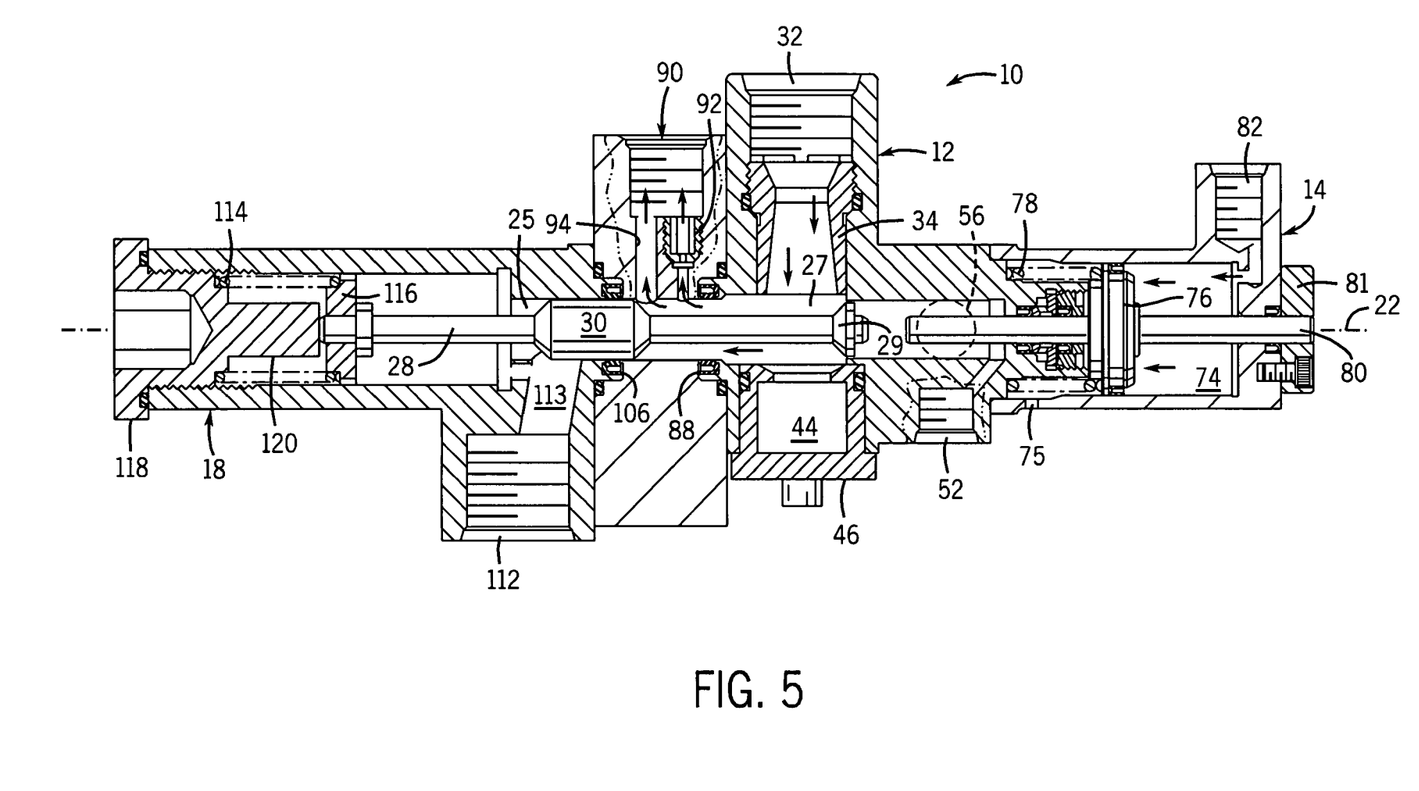
FIG. 5 is a cross-sectional view similar to FIG. 3 albeit showing the valve in a fueling mode.

With reference to FIGS. 3–5, the operation of the valve 10 will now be explained in detail. As shown in FIG. 3, prior to pressurization of the fuel by the fuel pump to pass through fuel inlet 32 or after fuel pressure has stopped when it is desired to shut down the turbine, the spool 28 is biased to fully block seal 88 to prevent fuel from reaching the distributor outlets, while fully opening seal 106. This biasing is by the spring 114 in the purge air section 18, but also by the pressure exerted on the spool valve section 30 by the purging air through purge air inlet 112. This arrangement allows the valve 10 to exhibit a positive shut off of the fuel.

In this position of the spool 28, the hot purge air can be forced though the valve, particularly, from the purge air inlet 112 and into the air only area 25 of the spool chamber 26 and through the fill nozzles 92 and the outlet orifices 94 of the distributor section 16, then onto to the burners in the combustion can of the turbine via the associated lines. The purge air works to prevent coking in the air only section 25 of the valve, and in particular at the downstream side of the valve section 30 of the spool 28, as well as lines and orifices downstream from the valve. Importantly, it also serves to cool the burners in the combustion can, since while the purge air is hot at about 400° F., it is significantly cooler than the temperatures realized during combustion, which near 2000° F. Preferably, the purge air is pressurized to nearly 300 psig and flows at about 0.05 lbs/sec.

Also when the spool 28 is in this position, fuel can be circulated through the valve, that is through the fuel inlet 32 to the fuel only area 27 of the spool chamber 26 and out through the recirculation ports 52 (via internal passageways 54). Preferably, this fuel stream is at a lower pressure and temperature of about 50 psig and 150° F. Circulating fuel through the valve 10 further works to reduce coking of the spool 28, particularly at the upstream side of the valve section 30.

At turbine startup, the actuator piston 72 is moved against spring 78 along the spool axis 22 toward the fuel section 12 by pressurized pilot air, preferably nearly 95 psig and up to about 300° F., acting on the large area of the actuator piston to move the spool 28 toward the air only area 25 of the spool chamber 26 so as to open seal 88 against the biasing force of spring 114, any anticipated pressure of the purging air and any frictional forces caused by minor coking of the spool 28. Friction from small amounts of coking on the valve section 30 are accommodated by the positive action of the spring and the pressurized purging air. The valve section 30 moves sufficiently away from seal 88 to provide an extremely low pressure drop across this junction. Again, because of the length of the valve section 30 of the spool 28, the fuel cannot begin to flow until the purging air through seal 106 has been completely shut off.

The spool 28 will initially move to the intermediate position shown in FIG. 4 in which the valve section 30 of the spool 28 moves off of seal 88 so that the fill nozzles 92 of the distributor section 16 are open but the outlet orifices 94 remain closed (although not technically sealed to the fuel). This allows an initial lower volume of fuel to prime the fuel lines and burners. The spool 28 will continue to move, initially under the force of the actuator piston 72 and the pressurized fuel and then solely the fuel force, to the position shown in FIG. 5 in which the outlet orifices are fully open.

The dimensions of the valve section 30 of the spool 28 and the strength of the spring 114 are selected such that at typical pressures of the fuel through the fuel inlet 32 and expected pressures of the purging air through purge air inlet 112, the spool 28 will remain in its left-most position without assistance from the actuator piston 72. Preferably, the fuel is diesel fuel at about 1200 psig and 250° F. and flowing at about 20 gpm. Failure of the pilot air supply will not cause a shutting down of the turbine so long as there is fuel pressure. When fuel pressure is also lost, however, the spool 28 will return to its right-most position sealing the seal 88 and providing an effective check valve against backflow into the fuel inlet 32. The freedom of the spool 28 to move without the influence of the actuator piston 72 allows it to provide both a check valve-type function and with the influence of the actuator piston 72, a pneumatically actuated valve function in one unit.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

I claim:

1. A combination distributor purge valve unit for a turbine engine, comprising:
   a fuel section having a fuel inlet;
   a purge air section having an air inlet;
   a distributor section disposed between the fuel section and the purge air section and having a plurality of outlets; and
   a spool movable along a spool axis from a first position in which the plurality of outlets are in communication with the air inlet and closed off from the fuel inlet to a second position in which the plurality of outlets are in communication with the fuel inlet and closed off from the air inlet.

2. The valve of claim 1, wherein each of the plurality of outlets includes first and second passageways, the first and second passageways being in communication with the air inlet when the spool is in the first position and in communication with the fuel inlet when the spool is in the second position.

3. The valve of claim 2, wherein the first passageways are fill nozzles and the second passageways are outlet orifices of greater bore diameter than the fill nozzles.

4. The valve of claim 3, wherein the fill nozzles are removably threaded to the distributor section.

5. The valve of claim 3, wherein the spool moves along the spool axis within a spool chamber extending within the fuel distributor and purge air sections and wherein the plurality of outlets are disposed about the spool axis so that the fill nozzles and outlet orifices extend radially from the spool chamber.

6. The valve of claim 5, wherein the distributor section has six outlets spaced equiangularly about the spool axis.

7. The valve of claim 2, wherein the spool is movable to an intermediate position along the spool axis between the first and second positions in which the first passageway is in communication with the fuel inlet and closed off from the air inlet and the second passageway is closed off from both the air inlet and the fuel inlet.

8. The valve of claim 1, wherein the spool is biased in the first position.

9. The valve of claim 1, wherein a first annular seal is disposed between the plurality of outlets and the fuel inlet and a second annular seal is disposed between the plurality of outlets and the air inlet.

10. The valve of claim 9, wherein the spool includes a valve section sized to mate with the first and second annular seals.

11. The valve of claim 1, further including a pilot air section adjacent the fuel section and containing an actuator piston disposed along the spool axis operable by pilot air to move the spool away from the first position.

12. The valve of claim 11, wherein when the spool is in the first position an end of the actuator piston contacts the spool within a spool chamber in which the spool is disposed.

13. The valve of claim 12, wherein the actuator piston moves within a piston chamber in the pilot air section and wherein an interstitial vent is disposed between the spool chamber and the piston chamber.

14. The valve of claim 13, further including an annular seal disposed about the actuator piston between the spool and piston chambers.

15. The valve of claim 13, further including two annular seals disposed about the actuator piston along the spool axis on each side of the interstitial vent.

16. The valve of claim 11, wherein the actuator piston is biased in the direction along the spool axis away from the spool.

17. The valve of claim 11, wherein the actuator piston includes an indicator stem visible form an exterior of the pilot air section.

18. The valve of claim 1, wherein the fuel section further includes a recirculation port in communication with the fuel inlet and an upstream side of a valve section of the spool through at least one internal passageway.

19. The valve of claim 1, wherein the distributor section includes a mounting bore extending parallel to the spool axis.

20. The valve of claim 1, wherein the fuel section includes a venturi passageway at the fuel inlet and a particle trap opposite the venturi passageway.

21. The valve of claim 20, wherein the spool moves in a spool chamber and wherein the particle trap is located on a side of the spool chamber opposite the venturi passageway.

22. The valve of claim 21, wherein the particle trap is accessible through a removable access plug.

* * * * *